(12) United States Patent
Chen et al.

(10) Patent No.: US 12,744,270 B2
(45) Date of Patent: Sep. 22, 2026

(54) BATTERY CELL COMPRISING CASE, ELECTRODE TERMINAL, AND SEALING MEMBER, BATTERY COMPRISING THE BATTERY CELL, AND ELECTRIC APPARATUS COMPRISING THE BATTERY

(71) Applicant: CONTEMPORARY AMPEREX TECHNOLOGY CO., LIMITED, Ningde (CN)

(72) Inventors: Shengwang Chen, Ningde (CN); Zhijun Guo, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/291,627

(22) Filed: Aug. 6, 2025

(65) Prior Publication Data

US 2025/0364650 A1 Nov. 27, 2025

Related U.S. Application Data

(63) Continuation of application No. PCT/CN2024/074996, filed on Jan. 31, 2024.

(30) Foreign Application Priority Data

May 30, 2023 (CN) ......................... 202310627550.5

(51) Int. Cl.
*H01M 50/184* (2021.01)
*H01M 50/188* (2021.01)
(Continued)

(52) U.S. Cl.
CPC ....... *H01M 50/184* (2021.01); *H01M 50/188* (2021.01); *H01M 50/566* (2021.01); *H01M 50/588* (2021.01); *H01M 2220/20* (2013.01)

(58) Field of Classification Search
None
See application file for complete search history.

(56) References Cited

U.S. PATENT DOCUMENTS

2015/0171411 A1* 6/2015 Kobayashi .......... H01M 50/528 429/61
2022/0209341 A1* 6/2022 Liu ..................... H01M 50/209
2023/0055271 A1 2/2023 Fang et al.

FOREIGN PATENT DOCUMENTS

CN 216720089 U 6/2022
CN 114865182 A 8/2022
(Continued)

OTHER PUBLICATIONS

Machine translation of CN 218602700 U.*
(Continued)

*Primary Examiner* — Jonathan G Leong
*Assistant Examiner* — Tony S Chuo
(74) *Attorney, Agent, or Firm* — K&L Gates LLP

(57) ABSTRACT

This application discloses a battery cell, a battery, and an electric apparatus. The battery cell includes a case, an electrode terminal, and a sealing member. The electrode terminal has an insertion portion and a flange portion connected in the axial direction, with the flange positioned outward of the insertion portion and extending beyond it in the radial direction. A groove extends along the axial direction of the terminal, with its opening on the outer face of the flange. The sealing member includes a body portion located in the groove to seal it, and an adapter portion at the end of the body portion facing away from the case. The adapter has a smaller radial dimension than the body and protrudes axially from the flange and body to allow electrical connection with an external component. This structure helps reduce
(Continued)

heat transfer to the electrode terminal, thereby improving thermal stability and safety of the battery cell.

19 Claims, 5 Drawing Sheets

(51) Int. Cl.
*H01M 50/566* (2021.01)
*H01M 50/588* (2021.01)

(56) References Cited

FOREIGN PATENT DOCUMENTS

| | | | |
|---|---|---|---|
| CN | 217468605 | U | 9/2022 |
| CN | 217788606 | U | 11/2022 |
| CN | 218602700 | U | 3/2023 |
| CN | 219067004 | U | 5/2023 |
| WO | 2022/217884 | A1 | 10/2022 |
| WO | 2023/068888 | A1 | 4/2023 |

OTHER PUBLICATIONS

Machine translation of JP H11339769 A.*
The International Search Report received in the counterpart International Application No. PCT/CN2024/074996, dated Apr. 10, 2024, 5 pages with English translation.
The ISA Written Opinion received in the counterpart International Application No. PCT/CN2024/074996, dated Apr. 10, 2024, 5 pages with English translation.
Extended European Search Report, mailed May 11, 2026, for corresponding European Patent Application Serial No. 24813725.9.

* cited by examiner

BATTERY CELL COMPRISING CASE, ELECTRODE TERMINAL, AND SEALING MEMBER, BATTERY COMPRISING THE BATTERY CELL, AND ELECTRIC APPARATUS COMPRISING THE BATTERY

CROSS-REFERENCE TO RELATED APPLICATIONS

This application is a continuation of International Application No. PCT/CN2024/074996, filed on Jan. 31, 2024, which claims priority to Chinese Application 202310627550.5 filed on May 30, 2023, and entitled "BATTERY CELL, BATTERY, AND ELECTRIC APPARATUS", which is incorporated herein by reference in its entirety.

TECHNICAL FIELD

The present application relates to the field of battery technologies, and in particular, to a battery cell, a battery, and an electric apparatus.

BACKGROUND

With the development of battery technologies, battery cells are applied in an increasing number of fields, and gradually replace traditional fossil energy sources in the field of automotive power. A battery cell may store chemical energy and controllably convert the chemical energy into electrical energy. In a recyclable battery cell, an active material may be activated by charging after discharging and used continuously.

The battery cell often includes an electrode assembly, an electrode terminal, a sealing member, and a case. The case can accommodate the electrode assembly. The electrode assembly is electrically connected to the electrode terminal. The sealing member seals a recessed portion of the electrode terminal, and connects the electrode terminal and an external component, so that current transmission is implemented between the electrode assembly and the external component. During production and use of the battery cell, heat is often generated at a joint between the sealing member and the external component, and the heat may be transferred to the electrode terminal and to other components of the battery cell via the electrode terminal, causing damage to the other components of the battery cell.

SUMMARY

In view of the foregoing problems, the present application provides a battery cell, a battery, and an electric apparatus, which are capable of reducing heat transferred to an electrode terminal.

According to a first aspect, provided in the present application is a battery cell. The battery cell comprises a case, an electrode terminal, and a sealing member. The case comprises a wall portion, the wall portion having a lead-out hole. The electrode terminal comprises an insertion portion and a flange portion which are connected to each other in an axial direction of the electrode terminal, the insertion portion being disposed in the lead-out hole, the flange portion being located on a side that is of the insertion portion and that is away from the inside of the case and being at least partially beyond the insertion portion in a radial direction of the electrode terminal, the electrode terminal having a groove portion disposed in the axial direction, and an opening end of the groove portion being located on an outer end face of the flange portion. The sealing member comprises a body portion and an adapter portion, the body portion being disposed in the groove portion and configured to seal the groove portion, the adapter portion being disposed at an end that is of the body portion and that faces away from the inside of the case, a radial dimension of the adapter portion being less than a radial dimension of the body portion, and an outer end face of the adapter portion protruding from the outer end face of the flange portion and an outer end face of the body portion in the axial direction and being configured to be electrically connected to an external component.

In the foregoing manner, the outer end face of the adapter portion can be spaced apart from the electrode terminal in both the axial direction and the radial direction, and when the adapter portion is being welded to the external component, transfer of heat to the electrode terminal is retarded, thereby reducing damage to another component of the battery cell in a welding process.

In some embodiments, the adapter portion is disposed centrally with respect to the body portion in the radial direction.

In the foregoing manner, the adapter portion and the outer end face of the flange portion are uniformly spaced apart from each other in the radial direction, so that transfer of heat from the outer end face of the adapter portion to the flange portion and another portion of the electrode terminal can be retarded, thereby reducing damage to another component of the battery cell.

In some embodiments, the adapter portion is electrically connected to an external component by welding.

In the foregoing manner, the electrode terminal can be stably connected to the external component.

In some embodiments, a height difference between the outer end face of the adapter portion and the outer end face of the flange portion is greater than or equal to 0.2 mm in the axial direction.

In the foregoing manner, the outer end face of the adapter portion and the outer end face of the flange portion can be spaced apart from each other by a sufficient distance, and when the adapter portion is being welded to the external component, transfer of heat through the electrode terminal is retarded.

In some embodiments, the outer end face of the body portion is located on a side that is of the outer end face of the flange portion and that faces the inside of the case in the axial direction.

In the foregoing manner, the distance between the outer end face of the body portion and the outer end face of the adapter portion can be increased in the axial direction, to retard transfer of heat to the electrode terminal.

In some embodiments, the groove portion comprises a first groove section, a second groove section, and a third groove section that are sequentially connected in a direction from the outside of the case to the inside of the case, the first groove section being located in the flange portion, the second groove section being located at least partially in the flange portion, a radial dimension of the first groove section being greater than a radial dimension of the second groove section, a first annular mesa being then formed at a joint between the first groove section and the second groove section, the radial dimension of the second groove section being greater than a radial dimension of the third groove section, a second annular mesa being then formed at a joint between the second groove section and the third groove section, and the body portion being disposed at least partially in the second groove section and supported on the second annular mesa.

In the foregoing manner, by disposing the first groove section, the outer end face of the body portion and the outer end face of the flange portion may be spaced apart from each other in the radial direction, and when the adapter portion is being welded to the external component, transfer of heat generated by welding to the electrode terminal is retarded. By disposing the second annular mesa, the fitting area when the flange portion abuts against the body portion can be increased, and stability of connection between the sealing member and the electrode terminal can be improved.

In some embodiments, the radial width of the first annular mesa is greater than or equal to 0.2 mm in the radial direction.

In the foregoing manner, the outer end face of the body portion and the outer end face of the flange portion can be spaced apart from each other by a sufficient distance, and when the adapter portion is being welded to the external component, transfer of heat generated by welding to the electrode terminal is retarded.

In some embodiments, the body portion is fixed to the electrode terminal by welding, and the outer end face of the body portion protrudes from the first annular mesa in the axial direction.

In the foregoing manner, welding heat can more easily act directly on the body portion, an effect of a welding connection between the body portion and the electrode terminal is enhanced, and the possibility that the welding heat acts directly on the electrode terminal can be reduced.

In some embodiments, a height difference between the outer end face of the body portion and the first annular mesa is greater than or equal to 0.1 mm.

In the foregoing manner, the outer end face of the body portion and the first annular mesa are spaced apart from each other by a sufficient distance in the axial direction, so that welding heat can more easily act directly on the body portion, and an effect of a welding connection between the body portion and the electrode terminal is enhanced.

In some embodiments, a radial minimum gap between a protruding portion of the body portion with respect to the first annular mesa and a groove wall of the first groove section is greater than or equal to 0.8 times the radial width of the first annular mesa in the radial direction.

In the foregoing manner, the outer peripheral surface of the protruding portion of the body portion with respect to the first annular mesa and the electrode terminal can be spaced apart from each other by a sufficient distance in the radial direction, to retard transfer of heat to the electrode terminal.

In some embodiments, in the axial direction, the outer end face of the body portion is located on the side that is of the outer end face of the flange portion and that faces the inside of the case, the axial depth of the first groove section is greater than or equal to 0.2 mm, and a height difference between the outer end face of the flange portion and the outer end face of the body portion is greater than or equal to 0.1 mm.

In the foregoing manner, the outer end face of the body portion and the outer end face of the adapter portion are spaced from each other by a sufficient distance in the axial direction, so that transfer of heat to the electrode terminal can be reduced.

In some embodiments, the radial width of an overlapping region between the body portion and the second annular mesa is greater than or equal to 0.2 mm in the radial direction.

In the foregoing manner, a contact area between the body portion and the flange portion can be increased, thereby improving stability of supporting the body portion by the flange portion.

In some embodiments, the radial dimension of the first groove section is less than or equal to a radial dimension of an outer peripheral surface of the insertion portion in the radial direction.

In the foregoing manner, an acting force exerted on the flange portion at the first annular mesa may be transmitted into the insertion portion in the axial direction. In this way, a risk that the flange portion is damaged by an axial acting force can be reduced.

In some embodiments, the flange portion is integrally formed with the insertion portion and is bent with respect to the insertion portion, and the first groove section is formed by punching.

In the foregoing manner, in a forming process of the electrode terminal, a transition rounded corner may be formed after the flange portion is bent with respect to the insertion portion. Forming the first groove section by punching can reduce a transition rounded corner between the flange portion and the insertion portion, thereby increasing the contact area between the flange portion and the body portion.

In some embodiments, each of the body portion and the second groove section is disposed in a shape of a truncated cone whose cross section gradually decreases in a direction toward the inside of the case.

In the foregoing manner, in an assembly process of the battery cell, insertion of the body portion into the second groove section can be guided, to facilitate insertion of the sealing member into the groove portion, which is conductive to improving assembly efficiency of the battery cell.

In some embodiments, the axial depth of the first groove section is less than the axial depth of the second groove section in the axial direction.

In the foregoing manner, a distance between the first annular mesa and a surface of the flange portion close to the inside of the case can be reduced, thereby improving a load bearing capability of a joint between the flange portion and the insertion portion.

In some embodiments, the ratio of the axial thickness of the body portion to a sum of the axial thickness of the body portion and the axial thickness of the adapter portion is greater than or equal to 0.4 in the axial direction.

In the foregoing manner, on the one hand, it is conductive to improving a limiting effect of the second groove section on the sealing member, and on the other hand, it is conductive to improving structural strength of the body portion, to improve a connection effect between the sealing member and the electrode terminal.

In some embodiments, an isolation groove surrounding a periphery of the adapter portion is disposed on the outer end face of the body portion.

In the foregoing manner, it is conductive to stress relief in a welding process of the sealing member and the electrode terminal.

In some embodiments, the battery cell comprises an insulating piece, the insulating piece surrounding a periphery of the electrode terminal and being located between the electrode terminal and the wall portion.

In the foregoing manner, a risk of a short circuit between the electrode terminal and the wall portion can be reduced.

In some embodiments, the electrode terminal comprises a sealing portion connected to the insertion portion, the sealing portion sealing at an end that is of the insertion portion and that faces the inside of the case to form a bottom wall of the groove portion.

In the foregoing manner, a manufacturing process of the electrode terminal can be simplified.

In some embodiments, the groove portion is configured to inject an electrolyte into the case.

In the foregoing manner, structural complexity of the battery cell can be reduced, and assembly efficiency of the battery cell can be improved.

In some embodiments, the sealing portion is provided with a liquid injection hole that communicates the inside of the case with the groove portion.

In the foregoing manner, since the thickness of the sealing portion is thin, it is conductive to formation of the liquid injection hole, and the injection of the electrolyte is facilitated.

In some embodiments, the battery cell further comprises a current collector plate and an electrode assembly that are disposed inside the case, the current collector plate being configured to connect a tab of the electrode assembly and the electrode terminal, and a side that is of the sealing portion and that faces away from the groove portion being welded to the current collector plate.

In the foregoing manner, implementation of an electrical connection between the electrode terminal and the electrode assembly is facilitated by disposing the current collector plate. A characteristic that the thickness of the sealing portion is thin is utilized for welding with the current collector plate, to facilitate implementation of an electrical connection between the electrode terminal and the current collector plate from a side that is of the electrode terminal and that faces away from the current collector plate.

In some embodiments, the battery cell further comprises an electrode assembly, and the case comprises a case body and an end cap, one end of the case body having an opening, the end cap covering the opening, the case body comprising a side wall and an end wall, the side wall surrounding an outer side of the electrode assembly, the end wall being disposed opposite to the opening, and the wall portion being the end cap or the end wall.

In the foregoing manner, assembly efficiency of the battery cell can be improved.

According to a second aspect, provided in the present application is a battery. The battery comprises the battery cell described above.

According to a third aspect, provided in the present application is an electric apparatus. The electric apparatus comprises the battery described above.

The above description is merely an overview of the technical solutions of the present application. For a clearer understanding of the technical means of the present application, the present application can be carried out in accordance with the content of the description, and in order to make the above and other objectives, characteristics, and advantages of the present application apparent and comprehensible, specific embodiments of the present application are described below.

DESCRIPTION OF DRAWINGS

Various other advantages and benefits will become clear to a person of ordinary skill in the art upon reading the detailed description of the preferred implementations below. The accompanying drawings are used only for the purpose of illustrating the preferred implementations and are not to be construed as limitations on the present application. Moreover, the same reference numerals are used to denote the same components throughout the accompanying drawings. In the accompanying drawings.

Figure 1:
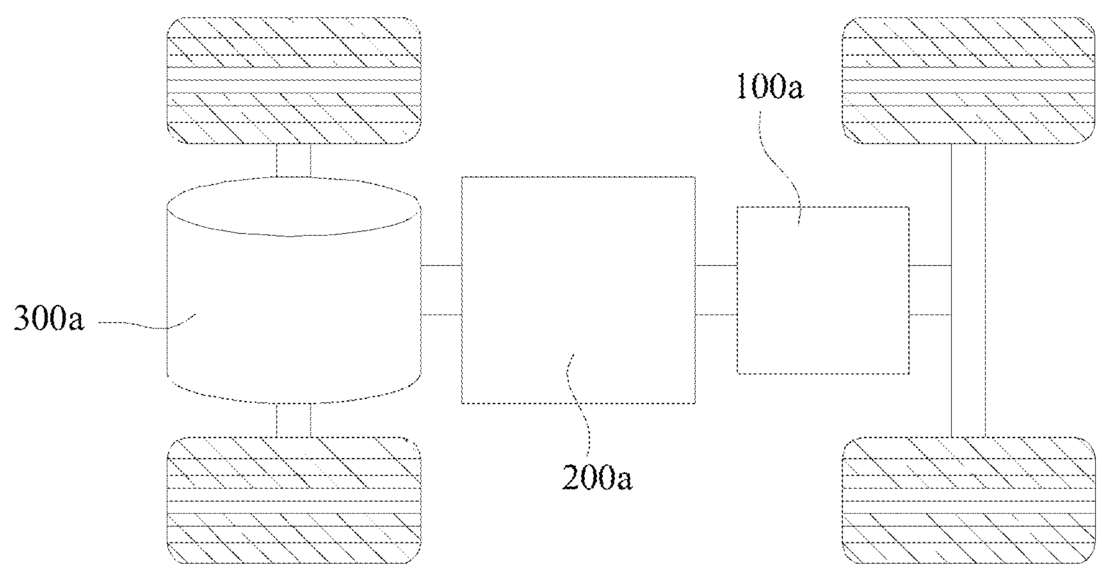
FIG. 1 is a schematic diagram of a structure of a vehicle according to one or more embodiments.

Reference numerals in specific implementations are as follows:

1000*a*: vehicle;

100*a*: battery; 200*a*: controller; 300*a*: motor;

10*a* box; 11*a* first portion; 12*a* second portion;

D1*a*: radial dimension of a second groove section; D1: radial dimension of an inner end face of a body portion; D2: radial dimension of a third groove section; D3: radial dimension of a first groove section; D4: radial dimension of an outer peripheral surface of an insertion portion; D5: radial dimension of an adapter portion; D6: radial dimension of a body portion; H1: axial depth of the first groove section; H2: height difference between an outer end face of the body portion and a first annular mesa; H3: axial thickness of the adapter portion; H4: height difference between an outer end face of the adapter portion and an outer end face of a flange portion; H5: sum of the axial thickness of the body portion and the axial thickness of the adapter portion; L1: radial width of the first annular mesa; L2: radial minimum gap between a protruding portion of the body portion with respect to the first annular mesa and a groove wall of the first groove section;

1: battery cell; 100*a*: battery; 100: case; 101: wall portion; 102: lead-out hole; 110: case body; 111: opening; 112: side wall; 113: end wall; 120: end cap; 200: electrode terminal; 210: insertion portion; 220: flange portion; 230: groove portion; 231: first groove section; 232: second groove section; 233: third groove section; 234: first annular mesa; 235: second annular mesa; 240: limiting flange; 250: sealing portion; 251: liquid injection hole; 260: transition rounded corner; 300: sealing member; 310: body portion; 311: isolation groove; 320: adapter portion; 400: current collector plate; 500: electrode assembly; 501: tab; 600: insulating piece; 700; sealing plug.

DESCRIPTION OF EMBODIMENTS

Embodiments of the technical solutions of the present application are described in detail below with reference to the drawings. The following embodiments are only used to more clearly illustrate the technical solutions of the present application, and thus are used as examples only, and are not intended to limit the protection range of the present application.

Unless defined otherwise, all technical and scientific terms used herein have the same meaning as commonly understood by a person skilled in the art to which the present application belongs; the terms used herein are used for describing particular embodiments only and are not intended to limit the present application; and the terms "comprising", "including", and "having" and any variations thereof in the description, claims, and the above drawings of the present application are intended to cover non-exclusive inclusion.

In the description of the embodiments of the present application, the technical terms "first", "second", and the like are used only for distinguishing between different objects, but cannot be construed to indicate or imply relative importance or implicitly indicate the number, specific order, or primary/secondary relationship of indicated technical features. In the description of the embodiments of the present application, "a plurality of" means two or more unless specifically defined otherwise.

Reference to "an embodiment" herein means that a particular feature, structure, or characteristic described with reference to the embodiment can be included in at least one embodiment of the present application. The phrase in various places in the description does not necessarily all refer to the same embodiment, or a separate or alternative embodiment mutually exclusive of other embodiments. It is explicitly and implicitly understood by a person skilled in the art that the embodiments described herein may be combined with other embodiments.

In the description of the embodiments of the present application, the term "and/or" merely describes an association relationship of associated objects, indicating that three relationships may exist, for example, A and/or B may mean that A exists alone, A and B exist simultaneously, or B exists alone. In addition, the character "/" herein generally indicates that associated objects are in an "or" relationship.

In the description of the embodiments of the present application, the term "a plurality of" means two or more (including two), and similarly, the term "a plurality of groups" means two or more groups (including two groups), and the term "a plurality of pieces" means two or more pieces (including two pieces).

In the description of the embodiments of the present application, orientations or positional relationships indicated by the technical terms such as "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", and the like are based on orientations or positional relationships shown in the drawings, and are merely for convenience of description of the embodiments of the present application and simplified description, and do not indicate or imply that an indicated apparatus or element must have a specific orientation or be configured and operated in a specific orientation, and thus should not be construed as limitations on the embodiments of the present application.

In the description of the embodiments of the present application, unless explicitly specified and defined otherwise, the terms "mount", "couple", "connect", and "fasten" should be broadly understood, for example, they may be a fixed connection, a detachable connection, or an integral connection; or may be a mechanical connection, or an electrical connection; or may be a direct connection, or an indirect connection via an intermediate medium, or an internal communication between two elements or interaction between two elements. A person of ordinary skill in the art may understand the specific meanings of the above terms in the embodiments of the present application according to specific situations.

With the development of battery technologies, battery cells are applied in an increasing number of fields, and gradually replace traditional fossil energy sources in the field of automotive power. A battery cell may store chemical energy and controllably convert the chemical energy into electrical energy. In a recyclable battery cell, an active material may be activated by charging after discharging and used continuously.

The battery cell often includes an electrode assembly, an electrode terminal, a sealing member, and a case. The case can accommodate the electrode assembly. The electrode assembly is electrically connected to the electrode terminal. The sealing member seals a recessed portion of the electrode terminal, and connects the electrode terminal and an external component, so that current transmission is implemented between the electrode assembly and the external component. During production and use of the battery cell, heat is often generated at a joint between the scaling member and the external component, and the heat may be transferred to the electrode terminal and to other components of the battery cell via the electrode terminal, causing damage to the other components of the battery cell.

To reduce heat transferred to the electrode terminal, in the present application, a flange portion is disposed on the electrode terminal, and a body portion and an adapter portion are disposed on the sealing member, the adapter portion being disposed at an end that is of the body portion and that faces away from the inside of the case, a radial dimension of the adapter portion being less than a radial dimension of the body portion, and an outer end face of the adapter portion protruding from the outer end face of the flange portion and an outer end face of the body portion in the axial direction and being configured to be electrically connected to an external component, so that the adapter portion and the outer end face of the flange portion are spaced apart from each other in both the axial direction and a radial direction.

Based on the foregoing considerations, provided in the present application are a battery cell, a battery, and an electric apparatus. That the adapter portion and the outer end face of the flange portion are spaced apart from each other can retard transfer of heat from the outer end face of the adapter portion to the flange portion. In this way, heat transferred to the electrode terminal can be reduced, thereby reducing damage caused by the heat to another component of the battery cell.

The battery cell, the battery, and the electric apparatus disclosed in the embodiments of the present application can be applied to an electric apparatus using a battery as a power supply or various energy storage systems using a battery as an energy storage element. The electric apparatus can be, but is not limited to, a mobile phone, a tablet computer, a notebook computer, an electric toy, an electric tool, a battery-powered vehicle, an electric vehicle, a ship, a spacecraft, and the like. The electric toy may include a stationary or mobile electric toy, such as a game machine, an electric car toy, an electric ship toy, an electric airplane toy, and the like, and the spacecraft may be an airplane, a rocket, a space shuttle, a spaceship, etc.

To facilitate description, in the following embodiments, as an example for description, an electric apparatus in an embodiment of the present application is a vehicle 1000*a*.

Referring to FIG. 1, the vehicle 1000*a* may be a fuel vehicle, a gas vehicle, or a new energy vehicle, and the new energy vehicle may be a battery electric vehicle, a hybrid vehicle, or a range-extended electric vehicle. Inside the vehicle 1000*a*, a battery 100*a* is disposed, and the battery 100*a* may be disposed at the bottom, head, or tail of the vehicle 1000*a*. The battery 100*a* may be configured to power the vehicle 1000a, for example, the battery 100a may be used as an operating power supply of the vehicle 1000a. The vehicle 1000a may further include a controller 200a and a motor 300a, and the controller 200a is configured to control the battery 100a to power the motor 300a, for example, for a working power requirement during starting, navigating, and driving the vehicle 1000a.

In some embodiments of the present application, the battery 100a may be used not only as the operating power supply of the vehicle 1000a, but also as a driving power supply of the vehicle 1000a, instead of or partially instead of fuel or natural gas to provide driving power for the vehicle 1000a.

Figure 2:
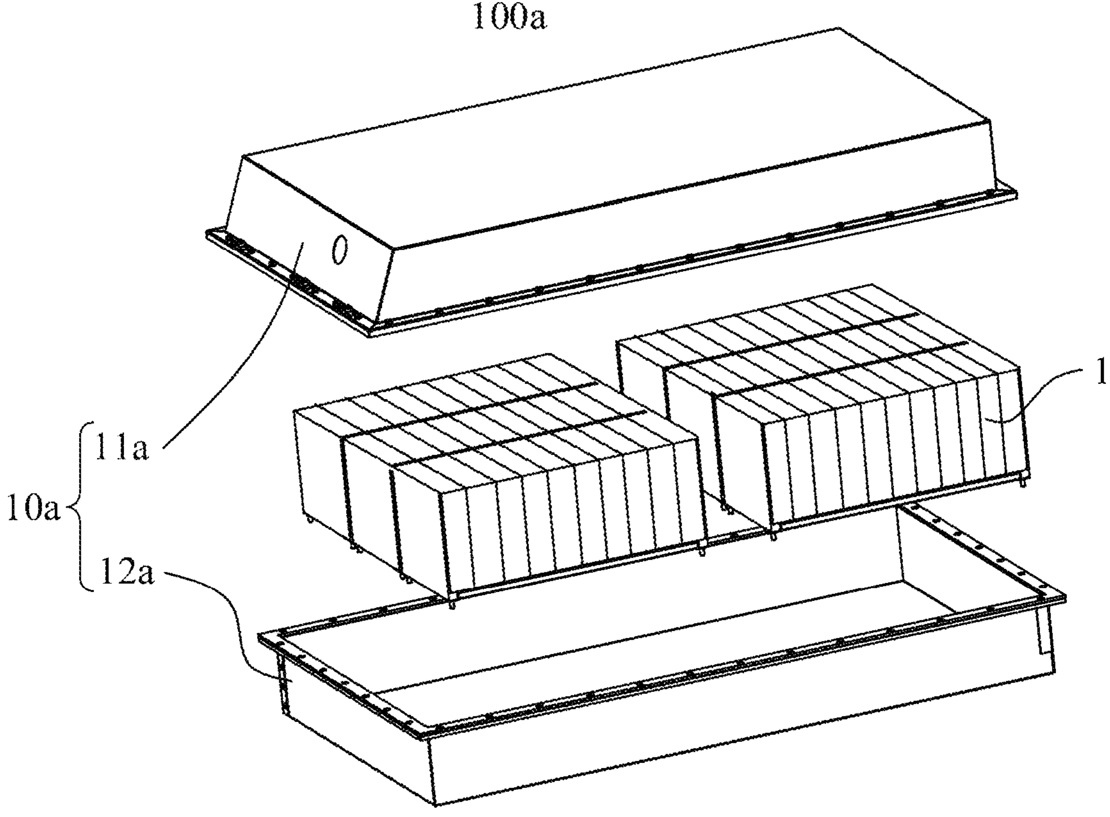
FIG. 2 is a schematic diagram of a decomposed structure of a battery according to one or more embodiments.

Referring to FIG. 2, the battery 100a includes a box 10a and a battery cell 1. The battery cell 1 is accommodated in the box 10a. Here, the box 10a is configured to provide an accommodation space for the battery cell 1, and the box 10a may have various structures. In some embodiments, the box 10a may include a first portion 11a and a second portion 12a, the first portion 11a and the second portion 12a fit to each other, and the first portion 11a and the second portion 12a jointly define the accommodation space for accommodating the battery cell 1. The second portion 12a may be a hollow structure with an opening at one end, the first portion 11a may be a plate-shaped structure, and the first portion 11a covers an opening side of the second portion 12a, so that the first portion 11a and the second portion 12a jointly define the accommodation space. The first portion 11a and the second portion 12a each may be a hollow structure with an opening at one end, and an opening side of the first portion 11a covers the opening side of the second portion 12a. Certainly, the box 10a formed by the first portion 11a and the second portion 12a may be in various shapes such as a cylinder, a cuboid, etc.

In the battery 100a, there may be a plurality of battery cells 1, and the plurality of battery cells 1 may be subjected to series connection, parallel connection, or series-parallel connection. The series-parallel connection means that the plurality of battery cells 1 are subjected to both series connection and parallel connection. The plurality of battery cells 1 may be subjected to series connection, parallel connection, or series-parallel connection directly, and then an integration formed by the plurality of battery cells 1 is accommodated in the box 10a. Certainly, the battery 100a may alternatively be a battery module formed by the plurality of battery cells 1 in series connection, parallel connection, or series-parallel connection, and then a plurality of battery modules are integrated through series connection, parallel connection, or series-parallel connection, and accommodated in the box 10a. The battery 100a may further include other structures. For example, the battery 100a may further include a current converging component for implementing an electrical connection between the plurality of battery cells 1.

Here, each battery cell 1 may be a secondary battery or a primary battery, or may be a lithium-sulfur battery, a sodium-ion battery, or a magnesium-ion battery, but is not limited thereto. The battery cell 1 may be in the shape of a cylinder, a flat body, a rectangular cuboid, etc.

Figure 3:
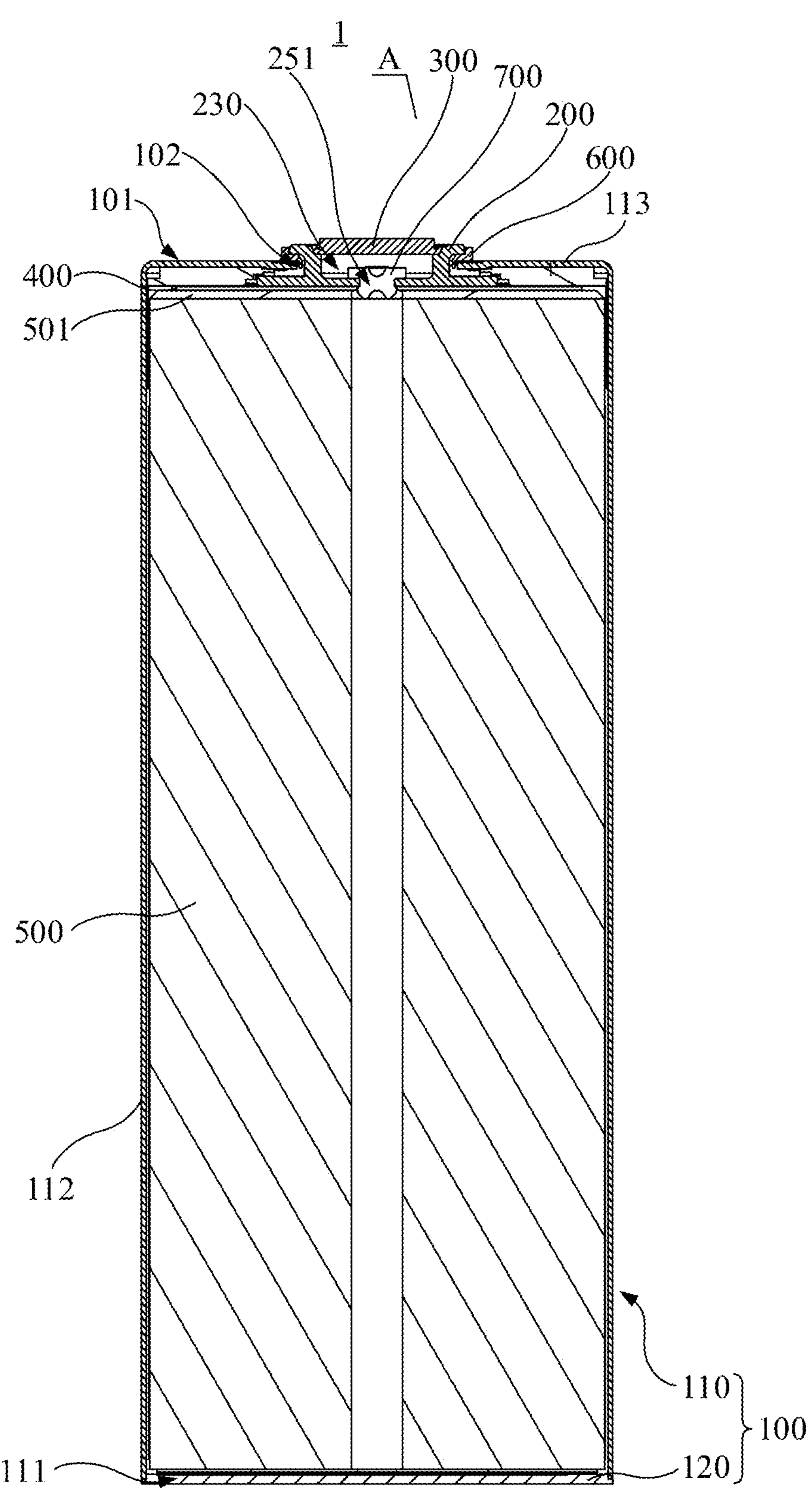
FIG. 3 is a schematic diagram of a cross-sectional structure of a battery cell according to one or more embodiments.

Referring to FIG. 3, the battery cell 1 refers to a minimum unit constituting a battery. In this embodiment, a cylindrical battery cell 1 is described as an example. The battery cell 1 includes a case 100, an electrode assembly 500, and other functional components.

The case 100 includes an end cap 120 and a case body 110. The end cap 120 is a component that covers an opening 111 of the case body 110 to insulate an internal environment of the battery cell 1 from an external environment. Without limitation, the shape of the end cap 120 may adapt to the shape of the case body 110 to fit the case body 110. Optionally, the end cap 120 may be made of a material with certain hardness and strength (e.g., aluminum alloy). As such, the end cap 120 is less prone to deformation under compressive impact, thereby enabling the battery cell 1 to have higher structural strength and improved safety performance. The end cap 120 may be provided with a functional component such as an electrode terminal 200. The electrode terminal 200 may be configured to be electrically connected to the electrode assembly 500, to output electric energy from or input electric energy into the battery cell 1. In some embodiments, a pressure relief mechanism for relieving internal pressure may be further disposed on the end cap 120 when the internal pressure or temperature of the battery cell 1 reaches a threshold. The end cap 120 may be made of various materials, such as copper, iron, aluminum, stainless steel, aluminum alloy, plastic, etc. The embodiments of the present application impose no special limitations thereto. In some embodiments, an insulating material piece may be further disposed on an inner side of the end cap 120, and the insulating material piece may be configured to isolate an electrical connection component in the case 110 from the end cap 120 to reduce a risk of a short circuit. For example, the insulating material piece may be plastic, rubber, etc.

The case body 110 is a component configured to cooperate with the end cap 120 to form an internal environment of the battery cell 1, where the formed internal environment may be used to accommodate the electrode assembly 500, an electrolyte, and other components. The case body 110 and the end cap 120 may be separate components, and an opening 111 may be disposed in the case body 110, and the end cap 120 covers the opening 111 at the opening 111 to form the inner environment of the battery cell 1. Without limitation, the end cap 120 and the case body 110 may also be integrated. Specifically, the end cap 120 and the case body 110 may form a joint connection surface before other components are fitted into the case, and then the end cap 120 is enabled to cover the case body 110 when the inside of the case body 110 needs to be enclosed. The case body 110 may be in various shapes and various dimensions, such as a cuboid, a cylinder, a hexagonal prism, etc. Specifically, the shape of the case body 110 may be determined based on a specific shape and dimension of the electrode assembly 500. The case body 110 may be made of various materials, such as copper, iron, aluminum, stainless steel, aluminum alloy, plastic, and the like. This is not specially limited in the embodiments of the present application.

The electrode assembly 500 is a component in which an electrochemical reaction occurs in the battery cell 1. The case body 110 may include one or more electrode assemblies 500. The electrode assembly 500 is mainly formed by winding or stacking a positive electrode sheet and a negative electrode sheet, and a separator is generally disposed between the positive electrode sheet and the negative electrode sheet. Parts of the positive electrode sheet and the negative electrode sheet with an active material constitute a main body portion of the electrode assembly, and parts of the positive electrode sheet and the negative electrode sheet without an active material each constitutes a tab 501. The tabs 501 may include a positive tab and a negative tab. The positive tab and the negative tab may both be located at one end of the main body portion or be located at two ends of the main body portion respectively. In a charging/discharging process of the battery 100a, a positive active material and a negative active material react with the electrolyte, and the tab 501 is connected to the electrode terminal to form a current circuit.

Figure 4:
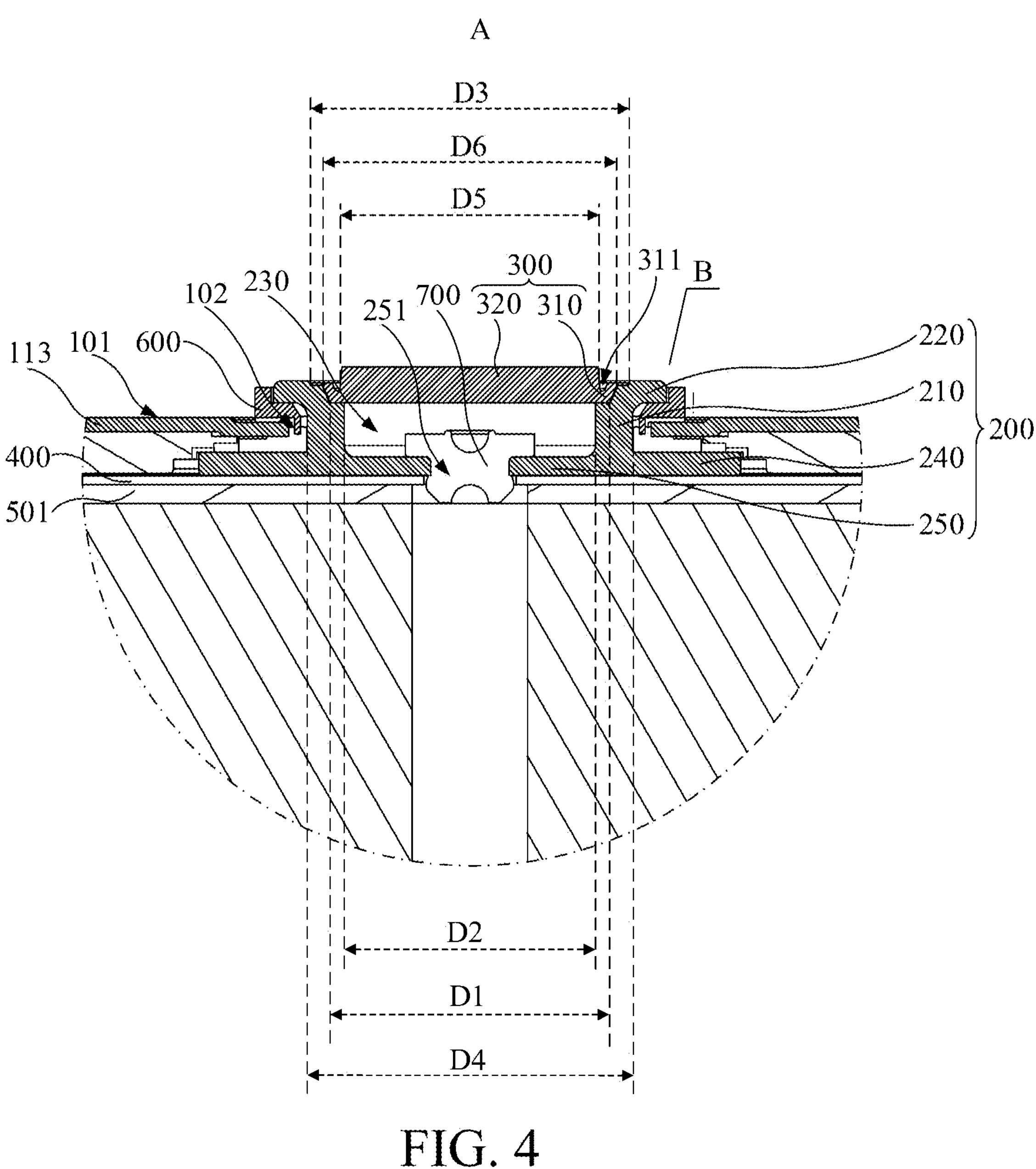
FIG. 4 is a schematic diagram of a structure of a portion A of the battery cell shown in FIG. 3.

According to some embodiments of the present application, as shown in FIG. 3 and FIG. 4, the battery cell 1 described in the battery cell embodiments of the present application includes a case 100, an electrode terminal 200, and a sealing member 300. The case 100 includes a wall portion 101, the wall portion 101 having a lead-out hole 102. The electrode terminal 200 includes an insertion portion 210 and a flange portion 220 which are connected to each other in an axial direction of the electrode terminal 200, the insertion portion 210 being disposed in the lead-out hole 102, the flange portion 220 being located on a side that is of the insertion portion 210 and that is away from the inside of the case 100 and being at least partially beyond the insertion portion 210 in a radial direction of the electrode terminal 200, the electrode terminal 200 having a groove portion 230 disposed in the axial direction, and an opening end of the groove portion 230 being located on an outer end face of the flange portion 220.

The axial direction of the electrode terminal 200 refers to a spacing direction between an end of the electrode terminal 200 facing the inside of the case 100 and an end facing away from the inside of the case 100, and the radial direction of the electrode terminal 200 refers to a direction perpendicular to the axial direction of the electrode terminal 200. For example, for a square electrode terminal 200, the radial direction of the electrode terminal 200 refers to a direction perpendicular to the axial direction of the electrode terminal 200. The axial direction and the radial direction described below refer to the axial direction and the radial direction of the electrode terminal 200 if they are not specified.

One end of the electrode terminal 200 is disposed toward the inside of the case 100, and may be configured to electrically connect an electrode assembly 500 disposed in the case 100. The other end of the electrode terminal 200 is disposed toward the outside of the case 100 and may be connected to the outside, so that charge and discharge of the electrode assembly 500 can be implemented. For example, the flange portion 220 may be formed at the other end of the electrode terminal 200, and the flange portion 220 is connected to the outside through the sealing member 300. By disposing the insertion portion 210 in the lead-out hole 102, the electrode terminal 200 can be mounted to the case 100.

In the radial direction of the electrode terminal 200, that the flange portion 220 is at least partially beyond the insertion portion 210 means that when the outer end face of the flange portion 220 is projected onto the insertion portion 210 in the axial direction, the outer end face of the flange portion 220 is positioned at least partially on an outer side of the outer end face of the insertion portion 210. That is, a radial dimension of at least part of the outer end face of the flange portion 220 is greater than a radial dimension D4 of the outer peripheral surface of the insertion portion 210. In this way, the flange portion 220 and the wall portion 101 may overlap on a periphery of the lead-out hole 102, to facilitate sealing connection between the electrode terminal 200 and the wall portion 101.

By disposing the flange portion 220, it is also conductive to increasing a radial dimension of the opening end of the groove portion 230, and the flange portion 220 and the sealing member 300 can overlap each other in the radial direction, thereby facilitating the mounting of the sealing member 300.

The sealing member 300 includes a body portion 310 and an adapter portion 320, the body portion 310 being disposed in the groove portion 230 and configured to seal the groove portion 230, the adapter portion 320 being disposed at an end that is of the body portion 310 and that faces away from the inside of the case 100, a radial dimension D5 of the adapter 320 portion being less than a radial dimension D6 of the body portion 310, and an outer end face of the adapter portion 320 protruding from the outer end face of the flange portion 220 and an outer end face of the body portion 310 in the axial direction and being configured to be electrically connected to an external component.

The groove portion 230 may communicate with the inside of the case 100. By disposing the body portion 310 to seal the groove portion 230, the sealing member 300 may be configured to alleviate leakage of the electrolyte inside the battery cell 1.

The presence of the groove portion 230 is not conductive to direct connection of the electrode terminal 200 to the external component. By disposing the sealing member 300, the electrode terminal 200 can be indirectly electrically connected to the external component. For example, by disposing the sealing member 300, the electrode terminal 200 can be indirectly electrically connected to the external component by welding, which is conductive to increasing the connection area between the battery cell 1 and the external component. Specifically, the outer end face of the adapter portion 320 may be located on an outer surface of the battery cell 1 so as to be electrically connected to the external component, while the sealing member 300 may be electrically connected to the electrode terminal 200 so that a current path may be formed between the electrode assembly 500, the electrode terminal 200, the sealing member 300, and the external component. For example, the battery cell 1 may be connected to a busbar (busbar) through the scaling member 300. The busbar (busbar) is a multi-layer composite structure connection bar that can be used to connect a plurality of battery cells 1 in series or parallel through welding or bolt connections.

During production and use of the battery cell 1, heat is generated at a joint between the adapter portion 320 and the external component. For example, the adapter portion 320 and the external component may be connected by welding, and heat may be generated in a welding process. For another example, heat is generated when a current flows through the joint between the adapter portion 320 and the external component.

In the axial direction, by disposing the outer end face of the adapter portion 320 to protrude from the outer end face of the flange portion 220 and the outer end face of the body portion 310, the outer end face of the adapter portion 320 and the outer end face of the flange portion 220 are spaced apart from each other in the axial direction, so that transfer of heat from the outer end face of the adapter portion 320 to the flange portion 220 and another portion of the electrode terminal 200 is retarded, thereby reducing damage caused by the heat to another component of the battery cell 1. For example, when the adapter portion 320 is welded to the external component, the transfer of heat from the outer end face of the adapter portion 320 to the flange portion 220 and the another portion of the electrode terminal 200 is retarded.

Optionally, the electrode terminal 200 may include a limiting flange 240, the limiting flange 240 being located inside the case 100 to prevent the electrode terminal 200 from being detached from the case 100.

According to some embodiments of the present application, optionally, as shown in FIG. 3 and FIG. 4, the adapter portion 320 is disposed centrally with respect to the body portion 310 in the radial direction.

The radial dimension of the outer end face of the flange portion 220 may be greater than the radial dimension D6 of the body portion 310. By setting the radial dimension D5 of the adapter portion 320 to be less than the radial dimension D6 of the body portion 310, accordingly, the radial dimension of the outer end face of the flange portion 220 may be greater than the radial dimension D5 of the adapter portion 320. By disposing the adapter portion 320 centrally with respect to the body portion 310 in the radial direction, the outer end face of the adapter portion 320 and the outer end face of the flange portion 220 are spaced apart from each other uniformly in the radial direction, so that the transfer of heat from the outer end face of the adapter portion 320 to the flange portion 220 and another portion of the electrode terminal 200 is retarded, thereby reducing damage caused by the heat to another component of the battery cell 1.

According to some embodiments of the present application, optionally, as shown in FIG. 3 and FIG. 4, the adapter portion 320 is electrically connected to the external component by welding. In this way, the electrode terminal 200 can be stably connected to the external component.

Figure 5:
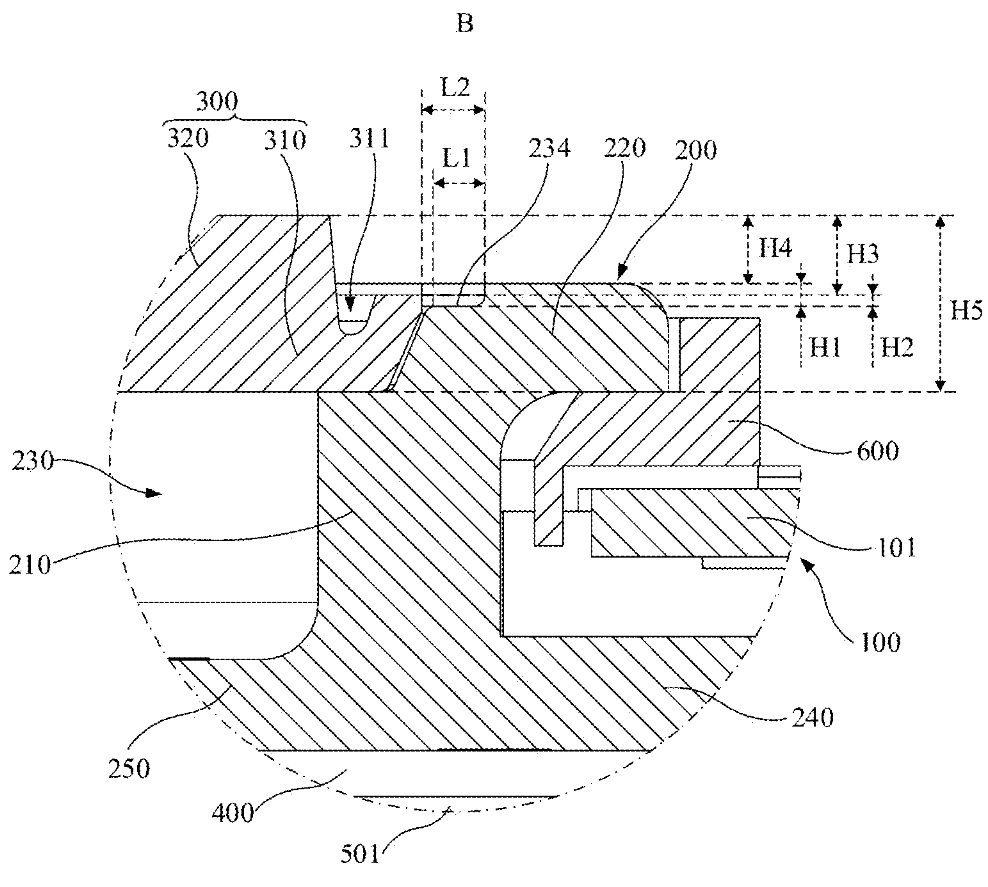
FIG. 5 is a schematic diagram of a structure of a portion B of the battery cell shown in FIG. 4.

According to some embodiments of the present application, optionally, as shown in FIG. 5, a height difference H4 between the outer end face of the adapter portion 320 and the outer end face of the flange portion 220 is greater than or equal to 0.2 mm in the axial direction. For example, H4 may be set to 0.3 mm, 0.5 mm, 0.8 mm, or 1 mm.

In this way, the outer end face of the adapter portion 320 and the outer end face of the flange portion 220 are spaced apart from each other by a sufficient distance, and transfer of heat through the electrode terminal 200 is retarded. Specifically, in this way, the transfer of heat from the outer end face of the adapter portion 320 to the flange portion 220 can be retarded, so that the heat received by the flange portion 220 is within an acceptable range, thereby reducing damage caused by the heat to another component of the battery cell 1.

According to some embodiments of the present application, optionally, as shown in FIG. 3 and FIG. 5, the outer end face of the body portion 310 is located on a side that is of the outer end face of the flange portion 220 and that faces the inside of the case 100 in the axial direction.

In this way, the distance between the outer end face of the body portion 310 and the outer end face of the adapter portion 320 can be increased in the axial direction, and the distance between the outer end face of the body portion 310 and the outer end face of the flange portion 220 in the axial direction can be increased, so that the transfer of heat to the electrode terminal 200 is retarded, thereby reducing damage caused by the heat to another component of the battery cell 1.

Figure 6:
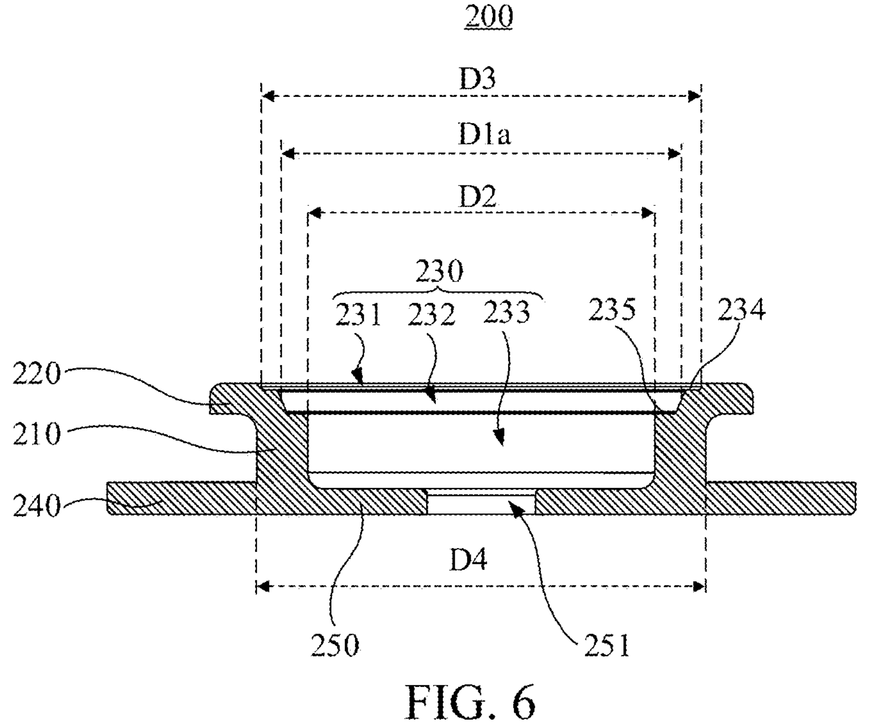
FIG. 6 is a schematic diagram of a structure of an electrode terminal shown in FIG. 3.

According to some embodiments of the present application, optionally, as shown in FIG. 4 to FIG. 6, the groove portion 230 includes a first groove section 231, a second groove section 232, and a third groove section 233 that are sequentially connected in a direction from the outside of the case 100 to the inside of the case 100, the first groove section 231 being located in the flange portion 220, the second groove section 232 being located at least partially in the flange portion 220, a radial dimension D3 of the first groove section 231 being greater than a radial dimension D1*a* of the second groove section 232, a first annular mesa 234 being then formed at a joint between the first groove section 231 and the second groove section 232, the radial dimension D1*a* of the second groove section 232 being greater than a radial dimension D2 of the third groove section 233, a second annular mesa 235 being then formed at a joint between the second groove section 232 and the third groove section 233, and the body portion 310 being disposed at least partially in the second groove section 232 and supported on the second annular mesa 235.

By disposing the first groove section 231, the outer end face of the body portion 310 and the outer end face of the flange portion 220 may be spaced apart from each other in the radial direction, so that transfer of heat to the electrode terminal 200 is retarded, thereby reducing damage caused by the heat to another component of the battery cell 1.

The second annular mesa 235 may be configured for abutment of the body portion 310. By disposing the second annular mesa 235, the fitting area when the flange portion 220 abuts against the body portion 310 can be increased, and stability of connection between the sealing member 300 and the electrode terminal 200 can be improved. By disposing the body portion 310 at least partially in the second groove section 232, the body portion 310 may seal the groove portion 230 in the second groove section 232, while the second groove section 232 may play a limiting role to the body portion 310 in the radial direction, to reduce a risk that the sealing member 300 slips out of the groove portion 230 in an assembly process.

Further, by disposing the first groove section 231 and the second groove section 232, a dimension of the battery cell 1 in the axial direction can be reduced. Specifically, by disposing the body portion 310 in the first groove section 231 and the second groove section 232, the body portion 310 and the electrode terminal 200 at least partially overlap each other in the axial direction, so that the dimension of the battery cell 1 in the axial direction can be reduced.

In some embodiments, the radial dimension D1*a* of the second groove section 232 may include a plurality of values, a value of D3 is greater than any value of D1*a*, and any value of D1*a* is greater than a value of D2.

According to some embodiments of the present application, optionally, as shown in FIG. 5, the radial width L1 of the first annular mesa 234 is greater than or equal to 0.2 mm in the radial direction. For example, L1 may be set to 0.3 mm, 0.5 mm, 0.8 mm, or 1 mm.

In this way, the outer end face of the body portion 310 and the outer end face of the flange portion 220 are spaced apart from each other by a sufficient distance, and transfer of heat to the electrode terminal 200 is retarded. Specifically, in this way, transfer of heat to the flange portion 220 can be retarded, and the heat received by the flange portion 220 can be reduced, thereby reducing damage caused by the heat to another component of the battery cell 1.

According to some embodiments of the present application, optionally, as shown in FIG. 5 and FIG. 6, the body portion 310 is fixed to the electrode terminal 200 by welding, and an outer end face of the body portion 310 protrudes from the first annular mesa 234 in the axial direction.

Specifically, in the axial direction, the outer end face of the body portion 310 is disposed to protrude from the first annular mesa 234 in a direction away from the inside of the case 100. In this way, the outer end face of the body portion 310 and the first annular mesa 234 may be spaced apart from each other in both the radial direction and the axial direction, and a possibility that welding heat generated in a welding process of the body portion 310 directly acts on the electrode terminal 200 can be reduced, thereby reducing absorption of the welding heat by the flange portion 220, so that the welding heat can more easily directly act on the body portion 310, to enhance an effect of a welding connection between the body portion 310 and the electrode terminal 200, and reduce an adverse effect on another component of the battery cell 1 after the welding heat directly acts on the flange portion 220.

Further, in an assembly process of the battery cell 1, when the body portion 310 has been inserted into the groove portion 230, a welding operation may be performed in the axial direction from one side of the outer end face of the body portion 310. A welding process may penetrate the body portion 310 and extend into the electrode terminal 200, and a melt that penetrates the body portion 310 and extends into the electrode terminal 200 may be formed in the axial direction, and a solder mark is formed after the melt is solidified, to implement a connection between the electrode terminal 200 and the body portion 310.

According to some embodiments of the present application, optionally, as shown in FIG. 5 and FIG. 6, a height difference H2 between the outer end face of the body portion 310 and the first annular mesa 234 is greater than or equal to 0.1 mm. For example, H2 may be set to 0.2 mm, 0.3 mm, 0.5 mm, 0.8 mm, or 1 mm.

In this way, the outer end face of the body portion 310 and the first annular mesa 234 can be spaced apart from each other by a sufficient distance in the axial direction, so that the welding heat generated in the welding process of the body portion 310 can more easily directly act on the body portion 310, and an effect of a welding connection between the body portion 310 and the electrode terminal 200 is enhanced. In addition, the sufficient distance in the axial direction can control absorption of the welding heat by the flange portion 220 within an acceptable range, thereby reducing an adverse effect on another component of the battery cell 1 after the welding heat is transferred to the flange portion 220.

According to some embodiments of the present application, optionally, as shown in FIG. 5 and FIG. 6, a radial minimum gap L2 between a protruding portion of the body portion 310 with respect to the first annular mesa 234 and a groove wall of the first groove section 231 is greater than or equal to 0.8 times the radial width L1 of the first annular mesa 234 in the radial direction. For example, L2 may be set to 0.9 times, 1 time, or 1.2 times of L1.

The outer end face of the flange portion 220 may extend from the groove wall of the first groove section 231 in a direction facing away from the body portion 310 in the radial direction. In this way, an outer peripheral surface of the protruding portion of the body portion 310 with respect to the first annular mesa 234 and the electrode terminal 200 are spaced apart from each other by a sufficient distance in the radial direction, to retard transfer of heat generated by welding to the electrode terminal 200, and control welding heat absorbed by a protruding portion of the electrode terminal 200 with respect to the first annular mesa 234 within an acceptable range, thereby reducing an adverse effect on another component of the battery cell 1 after the welding heat is transferred to the flange portion 220.

According to some embodiments of the present application, optionally, as shown in FIG. 5 and FIG. 6, the outer end face of the body portion 310 is located on a side that is of the outer end face of the flange portion 220 and that faces the inside of the case 100 in the axial direction. In this way, the outer end face of the body portion 310 and the outer end face of the adapter portion 320 are spaced apart from each other by a sufficient distance, and heat transferred to the electrode terminal 200 can be reduced.

The axial depth H1 of the first groove section 231 is greater than or equal to 0.2 mm, and a height difference H1−H2 between the outer end face of the flange portion 220 and the outer end face of the body portion 310 is greater than or equal to 0.1 mm. For example, H1=0.3 mm and H1−H2=0.15 mm, or H1=0.5 mm and H1−H2=0.3 mm. For another example, H1=0.5 mm and H1−H2=0.4 mm, or H1=0.8 mm and H1−H2=0.6 mm.

By setting the axial depth H1 of the first groove section 231 to be greater than or equal to 0.2 mm, the first annular mesa 234 and the outer end face of the flange portion 220 may be spaced apart from each other by a sufficient distance in the axial direction, so that heat transferred to the electrode terminal 200 can be reduced.

By setting the height difference H1−H2 between the outer end face of the flange portion 220 and the outer end face of the body portion 310 to be greater than or equal to 0.1 mm, the first annular mesa 234 and the outer end face of the body portion 310 may be spaced apart from each other by a sufficient distance in the axial direction, so that heat transferred to the electrode terminal 200 can be reduced.

According to some embodiments of the present application, optionally, as shown in FIG. 4 and FIG. 6, the radial width D1−D2 of an overlapping region between the body portion 310 and the second annular mesa 235 is greater than or equal to 0.2 mm in the radial direction. For example, D1−D2 may be set to 0.3 mm, 0.5 mm, 0.8 mm, or 1 mm.

D1 is a radial dimension of an inner end face of the body portion 310, and D2 represents a radial dimension of the third groove section 233.

The body portion 310 and the second annular mesa 235 have an overlapping region in the radial direction, and the body portion 310 and the second annular mesa 235 may contact each other in the overlapping region, so that the body portion 310 can be supported on the second annular mesa 235. Further, for a cylindrical battery cell 1, the overlapping region has a circular ring shape with the width being greater than or equal to 0.2 mm.

In the radial direction, by setting the radial width D1−D2 of the overlapping region between the body portion 310 and the second annular mesa 235 to be greater than or equal to 0.2 mm, the mutual contact area between the body portion 310 and the flange portion 220 can be increased, thereby improving stability supporting the body portion 310 by the flange portion 220.

According to some embodiments of the present application, optionally, as shown in FIG. 4 and FIG. 6, the radial dimension D3 of the first groove section 231 is less than or equal to the radial dimension D4 of the outer peripheral surface of the insertion portion 210 in the radial direction.

In a forming process of the first groove section 231 and the first annular mesa 234, the flange portion 220 may be subjected to an acting force from an external forming device at the first annular mesa 234 in the axial direction. By setting the radial dimension D3 of the first groove section 231 to be less than or equal to the radial dimension D4 of the outer peripheral surface of the insertion portion 210 in the radial direction, when the first annular mesa 234 is projected toward the insertion portion 210 in the axial direction, the projection of the first annular mesa 234 can fall within the insertion portion 210, and accordingly, an acting force received by the flange portion 220 at the first annular mesa 234 can be transmitted into the insertion portion 210 in the axial direction. In this way, a risk that the flange portion 220 is damaged by an axial acting force can be reduced. Specifically, by setting the radial dimension D3 of the first groove section 231 to be less than or equal to the radial dimension D4 of the outer peripheral surface of the insertion portion 210 in the radial direction, a risk of damage to a portion that is of the flange portion 220 and that protrudes from the insertion portion 210 in the radial direction can be reduced.

Figure 7:
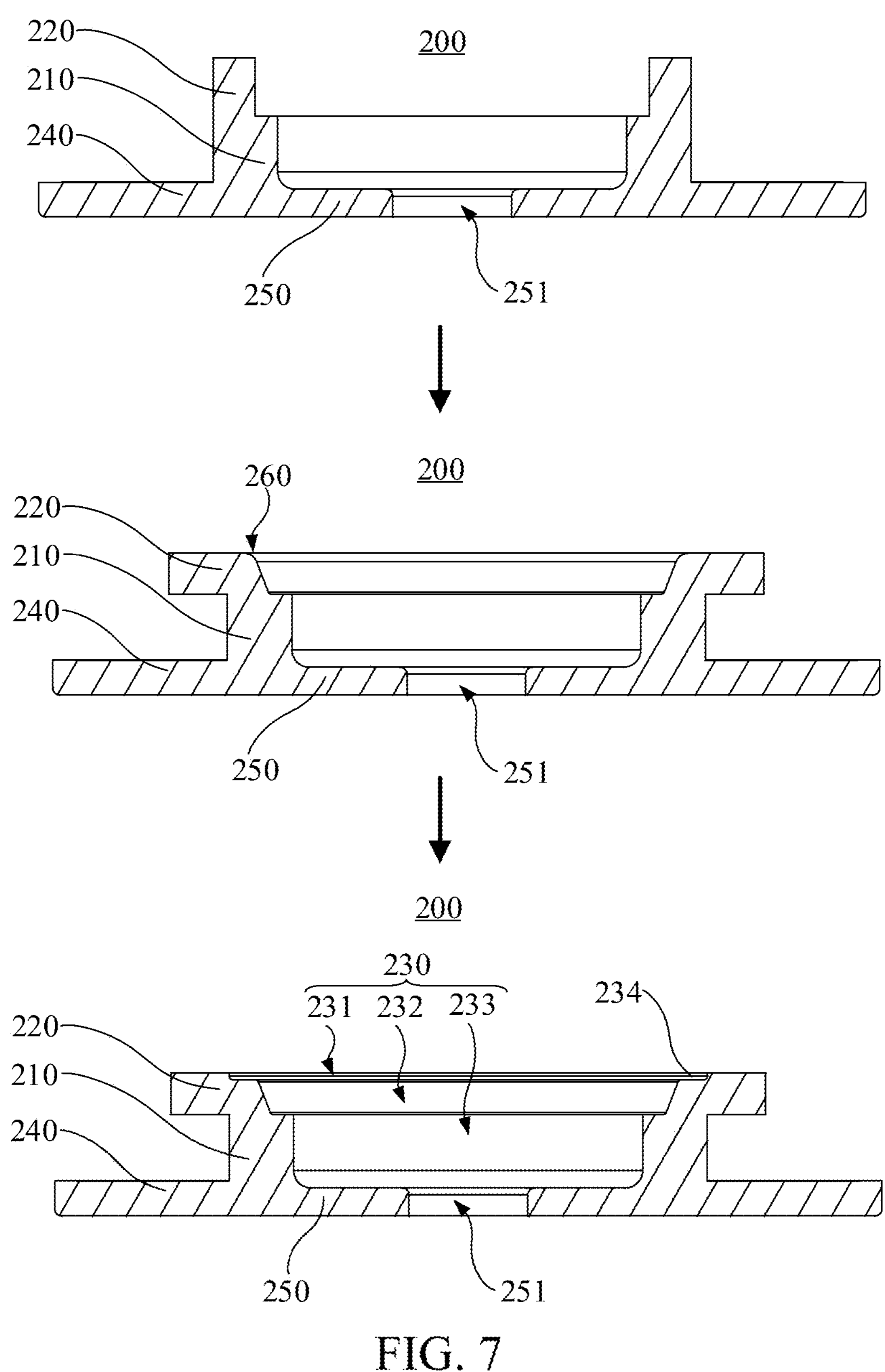
FIG. 7 is a schematic diagram of structural changes of an electrode terminal in an assembly process.

According to some embodiments of the present application, optionally, as shown in FIG. 6 and FIG. 7, the flange portion 220 is integrally formed with the insertion portion 210 and is bent with respect to the insertion portion 210, and the first groove section 231 is formed by punching.

In a forming process of the electrode terminal 200, a transition rounded corner 260 may be formed after the flange portion 220 is bent with respect to the insertion portion 210. The presence of the transition rounded corner 260 results in an excessively small contact area between the flange portion 220 and the outer peripheral surface of the body portion 310. The first groove section 231 may be formed by punching to reduce the transition rounded corner 260 between the flange portion 220 and the insertion portion 210, and increase the contact area between the flange portion 220 and the body portion 310, thereby improving a limiting effect of the second groove section 232 on the body portion 310 and improving a connection effect between the electrode terminal 200 and the sealing member 300.

Compared with cutting forming, punching forming has higher production efficiency, better quality stability of a formed surface, and less generation of waste materials, and is more suitable for mass production.

In an embodiment, the flange portion 220 originally has a tubular structure connected to and having a same outer diameter as that of the insertion portion 210, and the tubular structure is exposed to an outer side of the wall portion 101 after the insertion portion 210 is inserted into the lead-out hole 102, and then is bent with respect to the insertion portion 210 by pull riveting or tube expanding to form the flange portion 220.

According to some embodiments of the present application, optionally, as shown in FIG. 4 and FIG. 6, each of the body portion 310 and the second groove section 232 is disposed in a shape of a truncated cone whose cross section gradually decreases in a direction toward the inside of the case 100.

By disposing each of the body portion 310 and the second groove section 232 in the shape of a truncated cone whose cross section gradually decreases in the direction toward the inside of the case 100, in an assembly process of the battery cell 1, insertion of the body portion 310 into the second groove section 232 can be guided, to facilitate insertion of the sealing member 300 into the groove portion 230, which is conductive to improving assembly efficiency of the battery cell 1.

According to some embodiments of the present application, optionally, as shown in FIG. 5 and FIG. 6, the axial depth H1 of the first groove section 231 is less than the axial depth H5−H4−H1 of the second groove section 232 in the axial direction.

The first groove section 231 and the second groove section 232 may be jointly configured to accommodate the body portion 310, and the axial thickness H5−H3 of the body portion 310 may be less than a sum of the axial depth H1 of the first groove section 231 and the axial depth H5−H4−H1 of the second groove section 232. When the thickness of the flange portion 220 is constant, since the radial dimension D3 of the first groove section 231 is greater than the radial dimension D1*a* of the second groove section 232, a larger axial depth H1 of the first groove section 231 indicates a smaller distance between the first annular mesa 234 and a surface that is of the flange portion 220 and that is close to the inside of the case 100.

H3 represents the height difference between the outer end face of the adapter portion 320 and the outer end face of the body portion 310, and H3 may be equal to the axial thickness of the adapter portion 320.

By setting the axial depth H1 of the first groove section 231 to be less than the axial depth H5−H4−H1 of the second groove section 232, a distance between the first annular mesa 234 and a surface of the flange portion 220 close to the inside of the case 100 can be reduced, thereby improving a load bearing capability of a joint between the flange portion 220 and the insertion portion 210.

According to some embodiments of the present application, optionally, as shown in FIG. 5 and FIG. 6, the ratio of the axial thickness H5−H3 of the body portion 310 to a sum H5 of the axial thickness H5−H3 of the body portion 310 and the axial thickness H3 of the adapter portion 320 is greater than or equal to 0.4 in the axial direction. For example, (H5−H3)/H5 may be set to 0.5, 0.8, or 1.

For example, if H3=0.3 mm and H5=0.5 mm, H3=0.45 mm and H5=0.75 mm, or H3=0.6 mm and H5=1 mm, (H5−H3)/H5 may equal to 0.4.

For example, if H3=0.3 mm and H5=0.6 mm, H3=0.45 mm and H5=0.9 mm, or H3=0.6 mm and H5=1.2 mm, (H5−H3)/H5 may equal to 0.5.

In this way, on the one hand, it is conducive to improving an axial dimension of an overlapping portion between the body portion 310 and the second groove section 232 in the axial direction, and improving a limiting effect of the second groove section 232 on the sealing member 300, thereby facilitating assembly of the sealing member 300. In this way, on the other hand, it is conductive to improving structural strength of the body portion 310, to improve a connection effect between the sealing member 300 and the electrode terminal 200.

Further, the sum H5 of the axial thickness H5-H3 of the body portion 310 and the axial thickness H3 of the adapter portion 320 is the axial thickness of the electrode terminal 200.

According to some embodiments of the present application, optionally, as shown in FIG. 4, an isolation groove 311 surrounding a periphery of the adapter portion 320 is disposed on the outer end face of the body portion 310.

When a welding operation is performed at the body portion 310, strain and stress are generated in the body portion 310. By disposing the isolation groove 311, it is conductive to stress relief of the sealing member 300 in the welding process.

Optionally, the isolation groove 311 is obtained by bending the body portion 310 with respect to the adapter portion 320 in a direction facing away from the inside of the case 100.

Optionally, the isolation groove 311 is formed by cutting.

According to some embodiments of the present application, optionally, as shown in FIG. 4, the battery cell 1 includes an insulating piece 600, the insulating piece 600 surrounding a periphery of the electrode terminal 200 and being located between the electrode terminal 200 and the wall portion 101.

The insulating piece 600 may form insulation between the electrode terminal 200 and the wall portion 101, thereby limiting a current from flowing directly from the electrode terminal 200 to the wall portion 101 or flowing directly from the wall portion 101 to the electrode terminal 200. By disposing the insulating piece 600, a risk of a short circuit between the electrode terminal 200 and the wall portion 101 can be reduced.

Optionally, when the insertion portion 210 is disposed in the lead-out hole 102, there is a gap between the insertion portion 210 and the lead-out hole 102, and the insulating piece 600 may be disposed in the gap to fill the gap.

Further, two ends of the insulating piece 600 in the axial direction abut against the wall portion 101 and the flange portion 220, respectively.

Optionally, the insulating piece 600 may further play a sealing role, to limit an electrolyte from leaking from the gap.

Optionally, the insulating piece 600 may be made of an insulating plastic material.

According to some embodiments of the present application, optionally, as shown in FIG. 4 and FIG. 6, the electrode terminal 200 includes a sealing portion 250 connected to the insertion portion 210, the sealing portion 250 sealing at an end that is of the insertion portion 210 and that faces the inside of the case 100 to form a bottom wall of the groove portion 230.

A side that is of the sealing portion 250 and that faces away from the inside of the case 100 may form the bottom wall of the groove portion 230. By disposing the sealing portion 250, a manufacturing process of the electrode terminal 200 can be simplified.

According to some embodiments of the present application, optionally, as shown in FIG. 4, the groove portion 230 is configured to inject an electrolyte into the case 100.

In a production process of the battery cell 1, the groove portion 230 may communicate with the inside of the case 100, so that the electrolyte may be injected into the case 100 through the groove portion 230. By disposing the groove portion 230, after the electrode terminal 200 is assembled and connected to the case 100, the electrolyte can be injected by using the groove portion 230 and then sealed by using the sealing member 300, so that structural complexity of the battery cell 1 can be reduced, and assembly efficiency of the battery cell 1 can be improved.

According to some embodiments of the present application, optionally, as shown in FIG. 4, the sealing portion 250 is provided with a liquid injection hole 251, the liquid injection hole 251 communicating the inside of the case 100 with the groove portion 230.

Further, two ends of the liquid injection hole 251 in the axial direction may communicate with the groove portion 230 and the inside of the case 100, respectively.

During injection of the electrolyte, the electrolyte may flow through the groove portion 230 and the liquid injection hole 251 sequentially and then enter the inside of the case 100. The liquid injection hole 251 is disposed to facilitate sealing after the injection of the electrolyte is completed. The scaling portion 250 is thinner than the insertion portion 210, and the liquid injection hole 251 is disposed in the sealing portion 250, thereby facilitating formation of the liquid injection hole 251 and injection of the electrolyte.

Optionally, the battery cell 1 may include a sealing plug 700. As shown in FIG. 4, the sealing plug 700 may be configured to seal the liquid injection hole 251 after the injection of the electrolyte is completed. Further, the sealing plug 700 is made of an elastic polymer material, such as silica gel, rubber, etc.

According to some embodiments of the present application, optionally, as shown in FIG. 3 and FIG. 4, the battery cell 1 further includes a current collector plate 400 and an electrode assembly 500 that are disposed inside the case 100, the current collector plate 400 being configured to connect a tab 501 of the electrode assembly 500 and the electrode terminal 200, and a side that is of the sealing portion 250 and that faces away from the groove portion 230 being welded to the current collector plate 400.

The current collector plate 400 may be disposed between the electrode terminal 200 and the electrode assembly 500, and has a function of forming a current path between the electrode terminal 200 and the electrode assembly 500. Implementation of an electrical connection between the electrode terminal 200 and the electrode assembly 500 is facilitated by disposing the current collector plate 400. A characteristic that the thickness of the sealing portion 250 is thin is utilized for welding with the current collector plate 400, to facilitate implementation of an electrical connection between the electrode terminal 200 and the current collector plate 400 from a side that is of the electrode terminal 200 and that faces away from the current collector plate 400.

According to some embodiments of the present application, optionally, as shown in FIG. 3, the battery cell 1 further includes an electrode assembly 500, and the case 100 includes a case body 110 and an end cap 120, one end of the case body 110 having an opening 111, the end cap 120 covering the opening 111, the case body 110 including a side wall 112 and an end wall 113, the side wall 112 surrounding an outer side of the electrode assembly 500, the end wall 113 being disposed opposite to the opening 111, and the wall portion 101 being the end cap 120 or the end wall 113.

In the embodiments described above, the wall portion 101 is the end wall 113. In another embodiment, the wall portion 101 may alternatively be the end cap 120.

Since the end cap 120 or the end wall 113 is flatter than the side wall 112, assembly efficiency of the battery cell 1 can be improved by disposing the electrode terminal 200 and the sealing member 300 on the end cap 120 or the end wall 113.

According to some embodiments of the present application, optionally, as shown in FIG. 3 to FIG. 7, the battery cell 1 includes a case 100, an electrode terminal 200, and a sealing member 300. The case 100 includes a wall portion 101, the wall portion 101 having a lead-out hole 102. The electrode terminal 200 includes an insertion portion 210 and a flange portion 220 which are connected to each other in an axial direction of the electrode terminal 200, the insertion portion 210 being disposed in the lead-out hole 102, the flange portion 220 being located on a side that is of the insertion portion 210 and that is away from the inside of the case 100 and being at least partially beyond the insertion portion 210 in a radial direction of the electrode terminal 200, the electrode terminal 200 having a groove portion 230 disposed in the axial direction, and an opening end of the groove portion 230 being located on an outer end face of the flange portion 220. The sealing member 300 includes a body portion 310 and an adapter portion 320, the body portion 310 being disposed in the groove portion 230 and configured to seal the groove portion 230, the adapter portion 320 being disposed at an end that is of the body portion 310 and that faces away from the inside of the case 100, a radial dimension D5 of the adapter 320 portion being less than a radial dimension D6 of the body portion 310, and an outer end face of the adapter portion 320 protruding from the outer end face of the flange portion 220 and an outer end face of the body portion 310 in the axial direction and being configured to be electrically connected to an external component. The adapter portion 320 is disposed centrally with respect to the body portion 310 in the radial direction. The adapter portion 320 is electrically connected to the external component by welding. A height difference H4 between the outer end face of the adapter portion 320 and the outer end face of the flange portion 220 is greater than or equal to 0.2 mm in the axial direction. The outer end face of the body portion 310 is located on a side that is of the outer end face of the flange portion 220 and that faces the inside of the case 100 in the axial direction. The groove portion 230 includes a first groove section 231, a second groove section 232, and a third groove section 233 that are sequentially connected in a direction from the outside of the case 100 to the inside of the case 100, the first groove section 231 being located in the flange portion 220, the second groove section 232 being located at least partially in the flange portion 220, a radial dimension D3 of the first groove section 231 being greater than a radial dimension D1*a* of the second groove section 232, a first annular mesa 234 being then formed at a joint between the first groove section 231 and the second groove section 232, the radial dimension D1*a* of the second groove section 232 being greater than a radial dimension D2 of the third groove section 233, a second annular mesa 235 being then formed at a joint between the second groove section 232 and the third groove section 233, and the body portion 310 being disposed at least partially in the second groove section 232 and supported on the second annular mesa 235. The radial width L1 of the first annular mesa 234 is greater than or equal to 0.2 mm in the radial direction. The body portion 310 is fixed to the electrode terminal 200 by welding, and the outer end face of the body portion 310 protrudes from the first annular mesa 234 in the axial direction. A height difference H2 between the outer end face of the body portion 310 and the first annular mesa 234 is greater than or equal to 0.1 mm. A radial minimum gap L2 between the protruding portion of the body portion 310 with respect to the first annular mesa 234 and the groove wall of the first groove section 231 is greater than or equal to 0.8 times the radial width L1 of the first annular mesa 234 in the radial direction. In the axial direction, the outer end face of the body portion 310 is located on the side that is of the outer end face of the flange portion 220 and that faces the inside of the case 100, the axial depth H1 of the first groove section 231 is greater than or equal to 0.2 mm, and a height difference H1−H2 between the outer end face of the flange portion 220 and the outer end face of the body portion 310 is greater than or equal to 0.1 mm. The radial width D1−D2 of an overlapping region between the body portion 310 and the second annular mesa 235 is greater than or equal to 0.2 mm in the radial direction. The radial dimension D3 of the first groove section 231 is less than or equal to a radial dimension D4 of the outer peripheral surface of the insertion portion 210 in the radial direction. The flange portion 220 is integrally formed with the insertion portion 210 and is bent with respect to the insertion portion 210, and the first groove section 231 is formed by punching. Each of the body portion 310 and the second groove section 232 is disposed in a shape of a truncated cone whose cross section gradually decreases in a direction toward the inside of the case 100. The axial depth H1 of the first groove section 231 is less than the axial depth H5−H4−H1 of the second groove section 232 in the axial direction. The ratio of the axial thickness H5−H3 of the body portion 310 to a sum H5 of the axial thickness H5−H3 of the body portion 310 and the axial thickness H3 of the adapter portion 320 is greater than or equal to 0.4 in the axial direction. An isolation groove 311 surrounding a periphery of the adapter portion 320 is disposed on the outer end face of the body portion 310. The battery cell 1 includes an insulating piece 600, the insulating piece 600 surrounding a periphery of the electrode terminal 200 and being located between the electrode terminal 200 and the wall portion 101. The electrode terminal 200 includes a scaling portion 250 connected to the insertion portion 210, the sealing portion 250 sealing at an end that is of the insertion portion 210 and that faces the inside of the case 100 to form a bottom wall of the groove portion 230. The groove portion 230 is configured to inject an electrolyte into the case 100. The scaling portion 250 is provided with a liquid injection hole 251, the liquid injection hole 251 communicating the inside of the case 100 with the groove portion 230. The battery cell 1 further includes a current collector plate 400 and an electrode assembly 500 that are disposed inside the case 100, the current collector plate 400 being configured to connect a tab 501 of the electrode assembly 500 and the electrode terminal 200, and a side that is of the scaling portion 250 and that faces away from the groove portion 230 being welded to the current collector plate 400. The battery cell 1 further includes an electrode assembly 500, and the case 100 includes a case body 110 and an end cap 120, one end of the case body 110 having an opening 111, the end cap 120 covering the opening 111, the case body 110 including a side wall 112 and an end wall 113, the side wall 112 surrounding an outer side of the electrode assembly 500, the end wall 113 being disposed opposite to the opening 111, and the wall portion 101 being the end cap 120 or the end wall 113.

According to some embodiments of the present application, as shown in FIG. 2, the battery 100*a* includes the battery cell 1 described above. In this way, stability and reliability of the battery cell 1 during operation can be improved by reducing heat transferred to the electrode terminal 200, to further improve stability and reliability of the battery 100*a* during operation.

According to some embodiments of the present application, as shown in FIG. 1, the electric apparatus includes the battery 100*a* described above. In this way, the stability and reliability of the battery cell 1 during operation can be improved to improve the stability and reliability of the battery 100*a* during operation, to further improve stability and reliability of the electric apparatus during operation.

In conclusion, according to the embodiments of the present application, the outer end face of the adapter portion 320 and the outer end face of the flange portion 220 may be spaced apart from each other in both the axial direction and the radial direction, so that the transfer of heat from the outer end face of the adapter portion 320 to the flange portion 220 is retarded, thereby reducing damage caused by the heat to another component of the battery cell 1.

Finally, it should be noted that the above embodiments are only for the purpose of illustrating the technical solutions of the present application and are not to be construed as limiting the present application. Although the present application has been described in detail with reference to the above embodiments, it should be understood by a person of ordinary skill in the art that modifications may be made to the technical solutions described in the above embodiments, or equivalent replacement may be made to some or all of the technical features thereof. However, the modifications or replacements do not make the nature of corresponding technical solutions depart from the scope of the technical solutions of the embodiments of the present application, all of which shall fall within the scope of the claims and the description of the present application. In particular, the technical features mentioned in the embodiments may be combined in any manner provided that there is no structural conflict. The present application is not limited to the specific embodiments disclosed herein, but includes all technical solutions falling within the scope of the claims.

What is claimed is:

1. A battery cell, comprising:

a case, wherein the case comprises a wall portion, the wall portion having a lead-out hole;

an electrode terminal, wherein the electrode terminal comprises an insertion portion and a flange portion which are connected to each other in an axial direction of the electrode terminal, the insertion portion being disposed in the lead-out hole, the flange portion being located on a side that is of the insertion portion and that is away from the inside of the case and being at least partially beyond the insertion portion in a radial direction of the electrode terminal, the electrode terminal having a groove portion disposed in the axial direction, and an opening end of the groove portion being located on an outer end face of the flange portion; and a sealing member, wherein the sealing member comprises a body portion and an adapter portion, the body portion being disposed in the groove portion and configured to seal the groove portion, the adapter portion being disposed at an end that is of the body portion and that faces away from the inside of the case, a radial dimension of the adapter portion being less than a radial dimension of the body portion, an outer end face of the adapter portion protruding from the outer end face of the flange portion and an outer end face of the body portion in the axial direction and being configured to be electrically connected to an external component, the adapter portion is electrically connected to an external component by welding, a height difference between the outer end face of the adapter portion and the outer end face of the flange portion is greater than or equal to 0.2 mm in the axial direction, wherein the groove portion comprises a first groove section, a second groove section, and a third groove section that are sequentially connected in a direction from the outside of the case to the inside of the case, the first groove section being located in the flange portion, the second groove section being located at least partially in the flange portion, a radial dimension of the first groove section being greater than a radial dimension of the second groove section, a first annular mesa being then formed at a joint between the first groove section and the second groove section, the radial dimension of the second groove section being greater than a radial dimension of the third groove section, a second annular mesa being then formed at a joint between the second groove section and the third groove section, and the body portion being disposed at least partially in the second groove section and supported on the second annular mesa, wherein the radial width of the first annular mesa is greater than or equal to 0.2 mm in the radial direction;

the body portion is fixed to the electrode terminal by welding, and the outer end face of the body portion protrudes from the first annular mesa in the axial direction; and a height difference between the outer end face of the body portion and the first annular mesa is greater than or equal to 0.1 mm.

2. The battery cell according to claim 1, wherein the adapter portion is disposed centrally with respect to the body portion in the radial direction.

3. The battery cell according to claim 1, wherein the height difference between the outer end face of the adapter portion and the outer end face of the flange portion is greater than or equal to 0.5 mm in the axial direction.

4. The battery cell according to claim 1, wherein the outer end face of the body portion is located on a side that is of the outer end face of the flange portion and that faces the inside of the case in the axial direction.

5. The battery cell according to claim 1, wherein a radial minimum gap between a protruding portion of the body portion with respect to the first annular mesa and a groove wall of the first groove section is greater than or equal to 0.8 times the radial width of the first annular mesa in the radial direction.

6. The battery cell according to claim 1, wherein the outer end face of the body portion is located on the side that is of the outer end face of the flange portion and that faces the inside of the case in the axial direction, the axial depth of the first groove section is greater than or equal to 0.2 mm, and a height difference between the outer end face of the flange portion and the outer end face of the body portion is greater than or equal to 0.1 mm.

7. The battery cell according to claim 1, wherein the radial width of an overlapping region between the body portion and the second annular mesa is greater than or equal to 0.2 mm in the radial direction.

8. The battery cell according to claim 1, wherein the radial dimension of the first groove section is less than or equal to a radial dimension of an outer peripheral surface of the insertion portion in the radial direction.

9. The battery cell according to claim 1, wherein the flange portion is integrally formed with the insertion portion and is bent with respect to the insertion portion, and the first groove section is formed by punching.

10. The battery cell according to claim 1, wherein each of the body portion and the second groove section is disposed in a shape of a truncated cone whose cross section gradually decreases in a direction toward the inside of the case.

11. The battery cell according to claim 1, wherein the axial depth of the first groove section is less than the axial depth of the second groove section in the axial direction.

12. The battery cell according to claim 1, wherein the ratio of the axial thickness of the body portion to a sum of the axial thickness of the body portion and the axial thickness of the adapter portion is greater than or equal to 0.4 in the axial direction.

13. The battery cell according to claim 1, wherein an isolation groove surrounding a periphery of the adapter portion is disposed on the outer end face of the body portion.

14. The battery cell according to claim 1, comprising an insulating piece, the insulating piece surrounding a periphery of the electrode terminal and being located between the electrode terminal and the wall portion.

15. The battery cell according to claim 1, wherein the electrode terminal comprises a sealing portion connected to the insertion portion, the sealing portion sealing at an end that is of the insertion portion and that faces the inside of the case to form a bottom wall of the groove portion, wherein the groove portion is configured to inject an electrolyte into the case, and the sealing portion is provided with a liquid injection hole that communicates the inside of the case with the groove portion.

16. The battery cell according to claim 15, further comprising a current collector plate and an electrode assembly that are disposed inside the case, the current collector plate being configured to connect a tab of the electrode assembly and the electrode terminal, and a side that is of the sealing portion and that faces away from the groove portion being welded to the current collector plate.

17. The battery cell according to claim 1, further comprising an electrode assembly, wherein the case comprises a case body and an end cap, one end of the case body having an opening, the end cap covering the opening, the case body comprising a side wall and an end wall, the side wall surrounding an outer side of the electrode assembly, the end wall being disposed opposite to the opening, and the wall portion being the end cap or the end wall.

18. A battery, comprising the battery cell according to claim 1.

19. An electric apparatus, comprising the battery according to claim 18.

* * * * *